Nov. 23, 1954  J. A. LAUCK  2,694,979
OVERSPEED CONTROL FOR AIR TURBINE DRIVEN PUMPS
Filed May 16, 1950  2 Sheets-Sheet 1
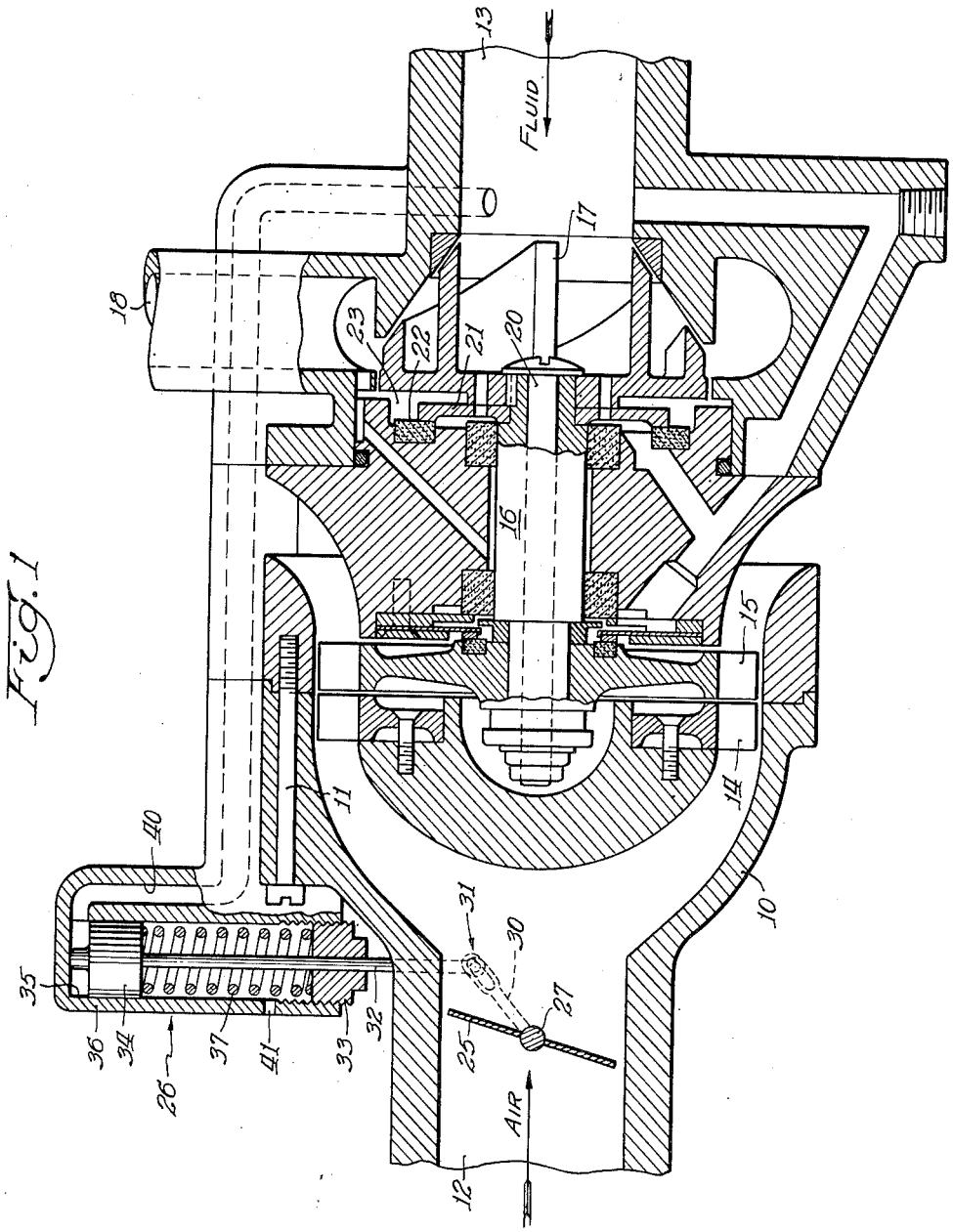
Inventor:
John A. Lauck Nov. 23, 1954  J. A. LAUCK  2,694,979
OVERSPEED CONTROL FOR AIR TURBINE DRIVEN PUMPS
Filed May 16, 1950   2 Sheets-Sheet 2
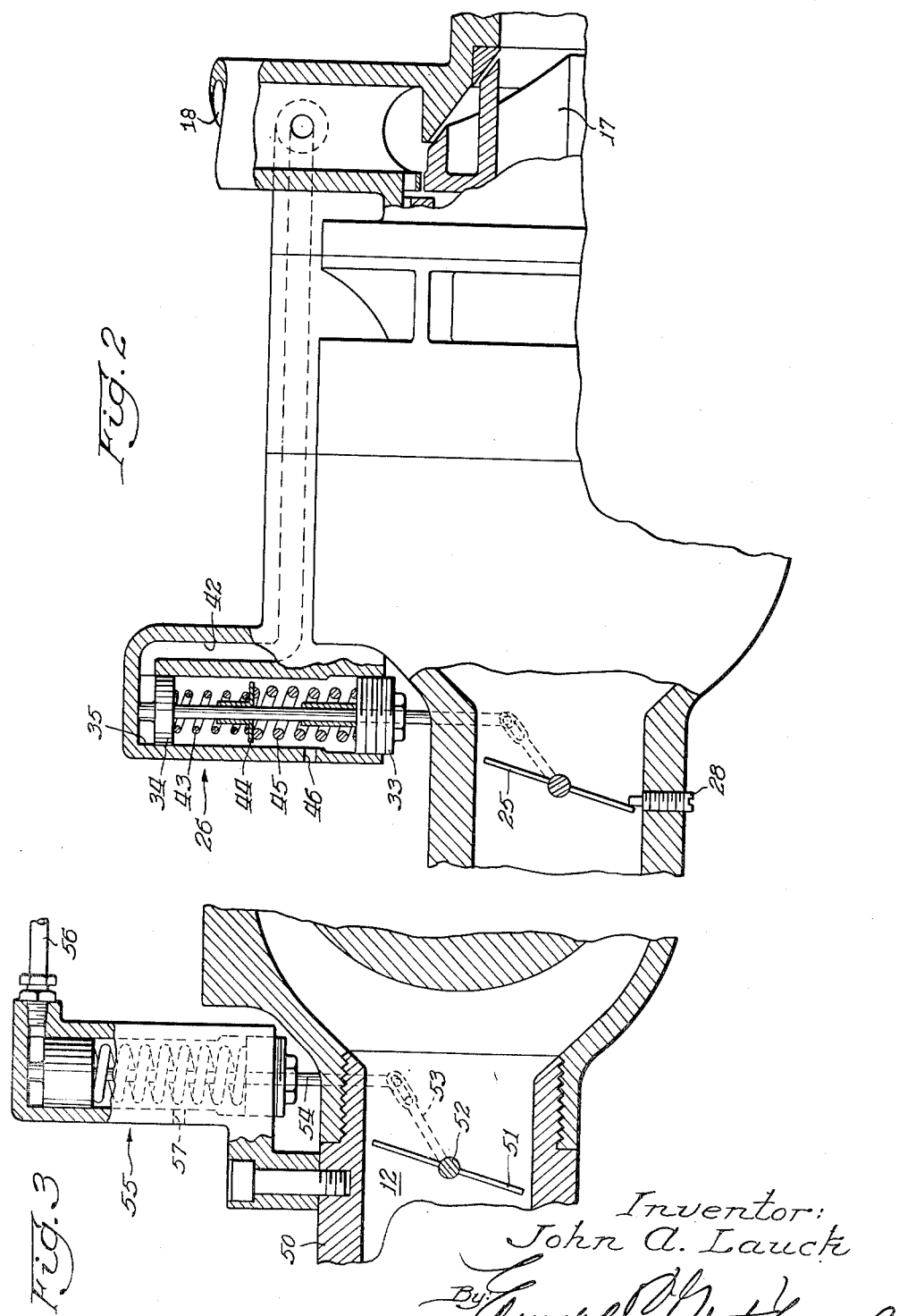
Inventor:
John A. Lauck
By Edward ...
Atty.

United States Patent Office 2,694,979
Patented Nov. 23, 1954

2,694,979

OVERSPEED CONTROL FOR AIR TURBINE DRIVEN PUMPS

John Alfred Lauck, Shaker Heights, Ohio, assignor to Borg-Warner Corporation, Chicago, Ill., a corporation of Illinois Application May 16, 1950, Serial No. 162,194

1 Claim. (Cl. 103—16)

This invention relates to an air turbine driven fluid pump, and more particularly to an overspeed control mechanism for an air turbine driven fluid pump.

Air turbine driven fluid pumps are sometimes employed in conjunction with jet type aircraft engines. Such pumps may be employed, for example, to inject fuel into the after-burner of this type engine or to inject water with fuel into the after-burner. The pumps are normally used only intermittently and a limited supply of fuel or water is provided to prevent damage to the engine from overloading. These pumps are normally designed to operate at extremely high rotational speeds and, thus, if the pump continues to rotate after exhaustion of the fluid supply to the pump, the pump will tend to overspeed. Overspeeding may be sufficient to cause flowering or deflection of the pump blades and destruction of the pump.

In order to prevent overspeeding of the pump, it has been proposed to employ a braking surface which, upon slight outward deflection of the pump impeller blades, would be engaged to cause slowing of the pump impeller. It has also been proposed to employ a pressure responsive switch connected in the discharge duct of the impeller which, when the discharge pressure dropped below a predetermined value, would actuate mechanism to shut off the supply of air to the air turbine. Neither of these proposals has provided an entirely satisfactory solution to the problem. The present invention is directed particularly to the problem of slowing the pump upon release of the pump load, to prevent damage to the pump, and provides an improved mechanism for accomplishing this as compared with the prior art devices mentioned above.

An object of the present invention is to provide an air turbine driven fluid pump incorporating therein a new and improved overspeed control mechanism.

A further object of the present invention is to provide a new and improved overspeed control mechanism adapted to be associated with an air turbine driven fluid pump.

In accordance with one embodiment of this invention, there may be provided an overspeed control mechanism comprising essentially a butterfly-type valve disposed in the air inlet duct of the air turbine and having associated therewith a servo piston effective to close the butterfly valve upon the pressure at the inlet side of the pump dropping below a predetermined minimum value. In accordance with a modification of this embodiment of the invention, the control piston may be connected to the fluid discharge side of the pump so as to respond to the reduction in pressure occurring as a result of cessation of fluid supply.

In accordance with a second embodiment of this invention, an overspeed control mechanism may be provided as a separate device which may be connected to or assembled on, but not formed integrally with, an air turbine driven fluid pump. As in the case of the first embodiment, this mechanism, and more particularly the servo piston associated therewith, may be made responsive either to inlet fluid pressure or discharge fluid pressure.

Other objects and advantages of the present invention will be apparent from the following detailed description taken in conjunction with the drawings wherein:

Fig. 1 is a longitudinal, sectional view of an air turbine driven fluid pump constructed in accordance with one embodiment of this invention and incorporating as an integral part thereof the overspeed control mechanism of the invention;

Fig. 2 is a fragmentary, sectional view, similar to Fig. 1, showing the overspeed control mechanism connected to the discharge side of the fluid impeller pump; and Fig. 3 is a fragmentary, sectional view, showing an adaptor type of overspeed control mechanism constructed in accordance with a second embodiment of this invention.

Referring now to the drawings, and particularly Fig. 1 thereof, it will be seen that the air turbine driven fluid pump of this invention comprises a generally cylindrical, three-sectioned housing 10, the sections of which are rigidly secured together, as by the bolt 11. Air inlet 12 is provided at the left end of the housing, as viewed in Fig. 1, and a fluid inlet 13 is provided at the right end of the housing. The air inlet 12 may be connected by a suitable duct to any source of air pressure as, for example, a jet engine compressor and the fluid inlet 13 is connected to a source of fuel, or where the pump is used for water injection, to a source of water. The fuel or water supplied to the fluid inlet 13 must be supplied under pressure and in an actual embodiment, the fuel or water is supplied under a pressure of not less than 5 lbs. p. s. i. as a desired minimum. Substantial dropping of the inlet pressure below this value may result in improper operation of the fluid pump.

Air entering inlet 12 passes through turbine stator blades 14 and drives turbine rotor 15, which is mounted on the left end of a shaft 16 journalled in the mid-section of the housing body. Fluid entering the fluid pump through the inlet 13 is pumped by an impeller 17 which, in the embodiment shown, is of the centrifugal type, and which delivers fluid under pumping pressure through an outlet or discharge duct 18. Impeller 17 is secured to the right end of shaft 16 by an axially extending bolt 20, which is threaded into the end of the shaft 16. The outlet duct 18 may be connected to any fluid pressure utilization device for which this apparatus is intended as, for example, an injection nozzle located in the after-burner of a jet engine.

As pointed out in the earlier-filed application of Kodet et al., S/N 85,884, filed April 6, 1949, an air turbine driven fluid pump of this type may be employed to deliver fluid at very high pressure, that is, pressures on the order of 250 to 400 pounds per square inch. At the same time, since the pump is intended for use in aircraft, its dimensions must be kept as small as feasible. Accordingly, in order to develop the required power, it is the practice to operate the turbine at extremely high rotational speeds, that is, speeds on the order of 25,000 R. P. M. and higher and this, of course, necessitates a high pressure air supply to the turbine rotor assembly. The high pressure air flow which may be on the order of 45 to 90 pounds per square inch or higher, applied to the rotor blades from the left, as viewed in Fig. 1, tends to force the driven shaft 16 and associated parts to the right and would, if not compensated in some manner, produce a side bearing pressure, that is, a pressure axially of the shaft of such a high value as to rapidly wear the bearing surfaces as well as to decrease the efficiency of the pump. As described in the aforementioned application, the various pressure areas in the pump are balanced one against the other in such manner that there is produced a resultant pressure of sufficiently reduced amount so that it may be employed to establish a definite location and bearing pressure of a thrust disc or washer 21 with respect to an adjacent bearing surface 22, the disc 21 being mounted rigidly on the driving shaft 16 and located in the recessed chamber 23 formed at the right end of the middle housing section adjacent the left side of impeller 17.

A pump constructed as described above and more particularly described in the aforementioned earlier-filed application is extremely efficient, and capable of operating for long periods at very high rotational speeds. However, if for any reason the fluid supply to inlet 13 is terminated, or the pressure thereof reduced below the desired minimum as hereinbefore stated, thereby removing the load from the pump then, since the air supply to the turbine is not normally simultaneously terminated, except by mechanism of the type herein provided or hereinbefore referred to, the pump will overspeed causing deflection or flowering of the impeller blades and possible destruction of the pump.

In accordance with a preferred embodiment of the present invention, there is incorporated in the pump an overspeed control mechanism comprising a valve 25 which is positioned in the air inlet 12 in such manner that it may be pivoted to reduce, or to shut off entirely if desired, the flow of air to the air turbine. Because of the arrangement of the air escape ducts on the discharge side of the turbine, it is not practical to mount the overspeed control valve in the discharge duct side. Furthermore, it has been found that due to the momentum of the turbine itself, positioning of the valve on the air discharge side of the turbine results in a delayed response which may well defeat the purpose of the overspeed control mechanism. Associated with the valve 25 is a servomotor 26 which is arranged to permit opening of the valve in the normal operation of the pump, but which upon a sufficient reduction of fluid pressure either at the inlet side or the discharge side of the impeller pump, will cause immediate movement of the valve toward closed position. In most cases, it is not necessary to shut off completely the air supply of the turbine, and it is adequate merely to reduce substantially this air supply in order to prevent overspeeding.

More particularly, the valve 25 comprises a disc-type or butterfly valve mounted on a shaft 27 journalled transversely in the air inlet passage 12 side walls. The valve may thus be supported in much the same manner as the air inlet control valve in a conventional automotive carburetor is mounted. The valve 25 may be mounted on the shaft 27 in balanced relation or in unbalanced relation, depending upon the response to air inlet pressure desired. Thus, where, as in the arrangement disclosed in the drawings, the valve opens by moving in a clockwise direction, it may be desirable to make the area of the lower half of the valve slightly less than the area of the upper half, thereby causing the valve to tend to open in response to air pressure applied from the inlet 12. This may be conveniently done either by notching the lower periphery of the valve to reduce the area thereof exposed to air flow as compared with the upper portion or by drilling a hole through the lower portion of the valve, or by actually mounting the valve eccentrically on the shaft 27. Where the servomotor 26 is made to respond to fluid inlet pressure, it is usually desirable to unbalance the valve 25 slightly in this manner so that the valve tends to open in response to air pressure applied thereto. On the other hand, where the servomotor 26 is made to respond to pump discharge pressure as disclosed in Fig. 2, then it may be desirable to unbalance the valve so that it tends to close in response to air inlet pressure and is positively opened due to the discharge pressure applied to the servomotor 26. In this case, it is then necessary either to make the valve smaller than the passage 12 or to provide a stop to prevent the valve from closing entirely so that some air flow will reach the turbine. A stop member such as the pin 28 threaded in the wall of inlet 12 and having its inner end positioned so as to be engaged by the right lower side of the valve 25 is satisfactory.

Rigidly secured to the shaft 27 at the end thereof projecting outside the far wall of passage 12 is the left end of a short lever arm 30, which arm extends to the right and is connected at its right end through a lost motion connection indicated generally at 31 to the lower end of a piston shaft 32 of the servomotor 26. Movement of the piston shaft 32 downwardly, as viewed in Fig. 1, causes clockwise rotation of the butterfly valve to cause opening of the valve. It will be evident that a lost motion connection of the type indicated is necessary due to the arcuate path of the right end of the short lever arm 30 with respect to the linear path of the end of the piston rod 32. The shaft 32 extends through and is journalled in a retainer plug 33 at its mid-portion, the upper end of the shaft 32 being connected to a piston 34 journalled in cylinder chamber 35 of the servomotor housing 36. Interposed between the lower side of the piston 34 and the upper side of the retainer plug 33 is a coiled compression spring 37 which urges the piston 34 upwardly, thereby tending to move the valve 25 to closed position. The compression force exerted by spring 37 may be adjusted by threading the retainer plug 33 further into or out of the chamber 35. The compression force of spring 37 must be selected very carefully with regard to the range of air pressure to be exerted against the valve, particularly if the valve be unbalanced, and the normal fluid supply pressure range to the impeller pump as well as the area of piston 34 exposed to supply pressure. As pointed out hereinbefore, the fluid inlet supply pressure should have a minimum value not less than 5 lbs. p. s. i. and the overspeed control mechanism is arranged to respond to a dropping of the fluid supply pressure below this desired minimum value. Supply pressure is communicated to the upper side of piston 34 through a passage 40 which may be conveniently formed in the housing 10 of the pump assembly or alternatively may be provided by a suitable tube which is connected at one end to the inlet side of the fluid pump and at its other end to the upper end of chamber 35. Vent port 41 formed in the lower side of the servomotor housing prevents hydraulic blocking of the piston action.

In the operation of the mechanism disclosed in Fig. 1, it will be evident that upon air pressure being supplied through the inlet passage 12 to the turbine, even in the absence of fluid pressure being supplied to the impeller pump, unless the valve 25 be wholly closed, the turbine will be driven. By slightly unbalancing the valve to bias it toward closing or opening in response to applied air pressure, the valve may be made to tend to close or open; however, unbalancing of the valve is not normally necessary or desirable. If at the same time fluid is supplied to the pump, under normal supply pressure, then this normal inlet supply pressure will be communicated to the piston 34, causing it to move downwardly against the spring 37. By a proper selection of the spring 37, the inlet pressure acting on piston 34 may be made sufficient to overcome the spring 37 and cause opening of the valve 25. Thereafter, if the fluid supply is interrupted, even momentarily, a drop in pressure at the inlet 13 will occur, and if the interruption be of sufficient duration, since the pump impeller will continue to turn, a vacuum will tend to be created. This will cause a rapid movement of the piston 34 upwardly, this upward movement of piston 34 being, of course, aided by the spring 37. Upward movement of piston 34 causes the valve 25 to move toward closed position, thereby restricting, or shutting entirely, depending on the location of the lever arm 30 and associated parts, the supply of air to the turbine. As pointed out hereinbefore, it is ordinarily not necessary to completely shut off the air supply in order to prevent overspeeding.

In the embodiment shown in Fig. 2, a slightly different arrangement of the servomotor is employed since in this embodiment the servomotor is made responsive to the pressure existing on the discharge side of the fluid impeller. Thus, in this embodiment, two springs of different compression values are employed in place of the single spring 37 so as to permit partial opening of the valve 25 in response to the relatively small force due to air inlet pressure and, thereafter, to permit the valve to open wide only in response to the larger force due to discharge pressure applied to the piston 34 through a duct 42, which is connected to the discharge duct of the fluid impeller pump. The duct 42, like the duct 40, may be formed in the housing 10 of the pump assembly or may be provided by a tube which is connected at one end to the discharge passage of the impeller pump and at its other end to the inlet passage of the servomotor.

More particularly, it will be seen that there is provided a light upper spring 43, the upper end of which bears against the underside of piston 34 and the lower end of which is located approximately at the mid-point of the cylinder and bears against the upper side of a flanged retainer sleeve 44. Sleeve 44 is journalled on the piston shaft and is free to move axially with respect thereto. The second and much heavier spring 45 is positioned in the lower part of cylinder 35 and its upper end bears against the lower side of flange 44 while its lower end bears against the upper side of the plug or retainer 33. Spring 45 is selected so as to have an overall length when not under compression of approximately half that of the distance from the upper surface of plug 33 to the lower side of piston 34 when the piston 34 is in its uppermost position. In this manner two rates or resistance conditions are provided. That is to say, a stepped resistance condition is provided wherein during the first part of the movement downward of piston 34 only the compression force exerted by the relatively light spring 43 is encountered, while upon continued downward movement, particularly movement past the mid-portion of the cylinder, the heavier compression force of spring 45 is encountered. Vent passage 46 admits air to the underside of the servomotor piston. In the operation of the overspeed control mechanism disclosed in Fig. 2, the valve 25, which is generally balanced, will permit a sufficient flow of air to the turbine to cause the turbine to turn the pump due to leakage around the valve clearance. This initial air flow to the turbine and resultant initial turning of the pump produces some fluid pressure against the piston 34, tending to move the piston downwardly and to further open the valve 25. As the valve 25 opens in response to the fluid pressure exerted against piston 34, the flow of air to the turbine is increased, thereby increasing the pump discharge pressure and consequently increasing the pressure against piston 34. Accordingly, the piston will be moved downwardly, quite readily at first against the compression of light spring 43, and later, with greater pressure exerted by the piston in response to discharge pressure against the compression of heavy spring 45. Thereafter, upon a cessation of fluid supply sufficient to cause a drop in pump discharge pressure, the piston 34 will move upwardly under the compression force of spring 45, tending to close the valve 25. By a proper selection of the compression forces exerted by these two springs, will be evident that the supply of air to the turbine may be closely proportioned to the discharge pressure so that an optimum working condition is maintained at all times without overload and without overspeeding. In the event of a total cessation of fluid supply, then the pressure on the discharge side of the impeller 17 drops substantially to zero and the piston 34 moves upwardly to its uppermost position, thereby closing valve 25 or restricting the flow of air to a value such that overspeeding of the turbine and the pump is avoided.

In some cases, particularly those air turbine driven pumps already in the field, it is not feasible or desirable to incorporate, as an integral part therewith, the overspeed control mechanism disclosed in Figs. 1 and 2. In such cases, in accordance with a second embodiment of this invention, there may be provided as an adaptor unit a separate overspeed control mechanism, which may be fitted to the air turbine pump.

Referring now to Fig. 3, it will be seen that the adaptor unit of this invention may comprise a sleeve 50, the right end of which may be peripherally threaded to threadably engage the left end of the inlet port 12 of the air turbine driven fluid pump, which would be complementarily threaded on the inner side thereof. It will be evident that threading is merely one way of accomplishing this connection and that a telescopic connection or other means of securing the sleeve 50 to the air inlet end of the pump may be employed. A valve 51, similar to the valve 25 of Figs. 1 and 2 is mounted in the sleeve 50 on a shaft 52 and pivoting of the valve to open or closed position is controlled through a lever arm 53 connected to a piston shaft 54 of a servo motor 55. The servo motor 55 is mounted on the sleeve 50 and has connected thereto one end of a tube 56, the other end of which tube may be connected either to the inlet side or the discharge side of the fluid pump. Vent passage 57, like passages 41 and 46, places the underside of the servo motor piston in communication with atmospheric pressure. The servo motor 55 may be of either the type illustrated in Fig. 1 or the type illustrated in Fig. 2, depending on whether the servo motor is to be made to respond to pump discharge pressure or pump inlet pressure. It will be evident without further discussion that by providing such an adaptor unit, air turbine driven fluid pumps already in service may be readily adapted to take advantage of the improvement afforded by this invention without substantial modification, it being necessary only to provide a port in the pump inlet or discharge to which tube 56 connected to the upper end of the cylinder of servo motor 55 may be connected to apply either inlet pressure or discharge pressure, as the case may be, to the servo motor piston.

In general, it is distinctly preferable to make the servo motor responsive to inlet fluid pressure as this results in a faster and more positive action on the part of the overspeed control mechanism. Thus, upon a cessation of fluid supply, there results not only a cessation of fluid pressure but actually a tendency toward a vacuum in the inlet side because of the continued pumping action of the fluid impeller. The servo piston is, therefore, moved upward not only by the spring but by air pressure entering through the vent passage in the side of the servo motor housing, this air pressure exceeding substantially the reduced pressure on the upper side of the servo motor piston.

Where herein the various parts of this invention have been referred to as being located in a right or a left position, it will be understood that this is done solely for the purpose of facilitating description and that such references relate only to the relative positions of the parts as shown in the accompanying drawings.

Although the servo motor has been described particularly as of the piston type, a diaphragm type motor may well be substituted, this latter type being generally somewhat more sensitive to lower pressure ranges and not so subject to sticking. It will be appreciated that where gasoline is pumped here may be an accumulation of gummy matter on the piston sides or the adjacent wall of the piston cylinder which may interfere to some extent with the movement of this piston.

While but two embodimens of this invenion have been shown and described, it will be understood that many changes and modifications may be made therein without departing from the spirit or scope of the invention.

What is claimed is:

An air driven fluid pump comprising, means defining a compact housing for said air driven fluid pump, an air turbine rotor and a fluid pump rotor coaxially mounted in said housing, means drivingly connecting said air turbine rotor to said fluid pump rotor, means forming a part of said housing defining an air inlet portion to said turbine rotor coaxial with said turbine rotor, means forming a part of said housing defining an air outlet portion from said air turbine coaxial with said air turbine rotor, means forming a portion of said housing defining a fluid inlet portion to said fluid pump coaxial with said fluid pump rotor, said air inlet portion and said air outlet portion forming together a duct which telescopes and overlaps said connecting means in coaxial relationship, a control valve mounted in said air inlet portion and having means cooperable therewith for regulating the supply of air to said air turbine rotor between a predetermined maximum value and a predetermined minimum value, said last mentioned means including a fluid pressure responsive servo motor having a movable member linked to said control valve, passage defining means connecting one side of said movable member to said fluid inlet whereby fluid inlet pressure is applied to said one side of said movable member which tends to urge said control valve to a position of maximum value of air supply, and said servo motor further including resilient means urging the other side of said movable member in the opposite direction whereby said control valve is moved toward a position of minimum value of air supply.

References Cited in the file of this patent

UNITED STATES PATENTS

| Number | Name | Date |
|---|---|---|
| 1,111,498 | Rotter | Sept. 22, 1914 |
| 1,655,683 | Standerwick | Jan. 10, 1928 |
| 1,863,406 | Hudson | June 14, 1932 |
| 2,250,865 | Griffin | July 29, 1941 |
| 2,324,236 | Price | July 13, 1943 |
| 2,376,143 | Edwards | May 15, 1945 |
| 2,382,412 | Grey | Aug. 14, 1945 |
| 2,491,380 | Kutzler | Dec. 13, 1949 |
| 2,512,438 | Ranzi | Jan. 20, 1950 |

FOREIGN PATENTS

| Number | Country | Date |
|---|---|---|
| 23,418 | Great Britain | 1906 |
| 282,818 | Great Britain | July 19, 1928 |
| 744,981 | France | Jan. 31, 1933 |